(12) United States Patent
Smith et al.

(10) Patent No.: US 7,687,587 B2
(45) Date of Patent: Mar. 30, 2010

(54) SILICONE COMPOSITION AND CURED SILICONE RESIN

(75) Inventors: Michael Andrew Smith, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 344 days.

(21) Appl. No.: 11/662,857

(22) PCT Filed: Nov. 1, 2005

(86) PCT No.: PCT/US2005/039376

§ 371 (c)(1),
(2), (4) Date: Mar. 14, 2007

(87) PCT Pub. No.: WO2006/055231

PCT Pub. Date: May 26, 2006

(65) Prior Publication Data

US 2007/0260082 A1   Nov. 8, 2007

Related U.S. Application Data

(60) Provisional application No. 60/629,620, filed on Nov. 19, 2004, provisional application No. 60/652,442, filed on Feb. 11, 2005.

(51) Int. Cl.
*C08L 83/04* (2006.01)
(52) U.S. Cl. .................. 525/478; 525/477; 525/479; 528/15; 528/31; 528/32; 528/35
(58) Field of Classification Search .......... 528/31, 528/43; 525/477–479
See application file for complete search history.

(56) References Cited

U.S. PATENT DOCUMENTS

| | | | |
|---|---|---|---|
| 3,419,593 A | 12/1968 | Willing | |
| 4,087,585 A | 5/1978 | Schulz | |
| 4,766,176 A | 8/1988 | Lee et al. | |
| 5,017,654 A | 5/1991 | Togashi et al. | |
| 5,194,649 A | 3/1993 | Okawa | |
| 6,310,146 B1 * | 10/2001 | Katsoulis et al. | 525/477 |
| 6,509,423 B1 | 1/2003 | Zhu | |
| 6,646,039 B2 | 11/2003 | Li et al. | |
| 6,689,859 B2 | 2/2004 | Li et al. | |
| 7,019,100 B2 * | 3/2006 | Tabei et al. | 528/43 |
| 2003/0171486 A1 | 9/2003 | Li et al. | |
| 2005/0061437 A1 * | 3/2005 | Goto et al. | 156/329 |

OTHER PUBLICATIONS

Anderson & Associates, Andisil MVC, retrieved 06/08/209.*

* cited by examiner

*Primary Examiner*—Marc S Zimmer
(74) *Attorney, Agent, or Firm*—Timothy J. Troy

(57) ABSTRACT

A silicone composition according to the present invention comprises (A) an organopolysiloxane resin having an average of at least two silicon-bonded alkenyl groups per molecule, (B) an organohydrogensilane in an amount sufficient to cure the composition, (C) an effective amount of a reactive diluent comprising (i) an organosiloxane having an average of at least two alkenyl groups per molecule and a viscosity of from 0.001 to 2 Pa·s at 25° C., wherein the viscosity of (C)(i) is not greater than 20% of the viscosity of component (A), and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (C)(ii) to moles of alkenyl groups in (C)(i), and (D) a catalytic amount of a hydrosilylation catalyst; and a cured silicone resin prepared by curing the silicone composition.

11 Claims, No Drawings

SILICONE COMPOSITION AND CURED SILICONE RESIN

CROSS REFERENCE TO RELATED APPLICATIONS

This application is a U.S. national stage filing under 35 U.S.C. §371 of PCT Application No. PCT/US05/039376 filed on 1 Nov. 2005, currently pending, which claims the benefit of U.S. Provisional Patent Application No. 60/629,620 filed 19 Nov. 2004, and U.S. Provisional Patent Application No. 60/652,442 filed 11 Feb. 2005 under 35 U.S.C. §119 (e). PCT Application No. PCT/US05/039376 and U.S. Provisional Patent Application No. 60/629,620 and 60/652,442 are hereby incorporated by reference.

FIELD OF THE INVENTION

The present invention relates to a silicone composition and more particularly to a silicone composition containing a reactive diluent comprising an alkenyl-functional organosiloxane and an organohydrogensiloxane. The present invention also relates to a cured silicone resin prepared by curing the composition.

BACKGROUND OF THE INVENTION

Silicones are useful in a variety of applications by virtue of their unique combination of properties, including high thermal stability, good moisture resistance, excellent flexibility, high ionic purity, low alpha particle emissions, and good adhesion to various substrates. For example, silicones are widely used in the automotive, electronic, construction, appliance, and aerospace industries.

Silicone compositions comprising an organopolysiloxane resin, organohydrogen-silane, and hydrosilylation catalyst are known in the art. The organopolysiloxane resin is typically a copolymer containing T and/or Q siloxane units in combination with M and/or D units. However, such compositions cure to form silicone products having relatively low fracture toughness, rendering them unsatisfactory for certain applications, such as fiber-reinforced composites, interlayer dielectrics, and abrasion resistant coatings.

Various approaches to improving the fracture toughness of cured silicone resins are reported in the literature. For example, U.S. Pat. No. 6,310,146 to Katsoulis et al. discloses a hydrosilylation reaction curable composition comprising a silsesquioxane copolymer, a silyl-terminated hydrocarbon, and a hydrosilylation reaction catalyst. The '146 patent also teaches that the cured silsesquioxane resin has improved strength and toughness without significant loss of modulus.

U.S. Pat. No. 6,509,423 to Zhu discloses a silicone resin composition comprising (A) 100 parts by weight of an organopolysiloxane resin containing an average of greater than two alkenyl groups per molecule and having less than 1.5 mole % percent of silicon-bonded hydroxy groups, (B) an organohydrogensilane in an amount sufficient to cure the composition, (C) an effective amount of an inorganic filler, and (D) a catalytic amount of a hydrosilylation catalyst. The '423 patent teaches that the silicone composition cures to form a silicone product having a low coefficient of thermal expansion and superior fracture toughness.

U.S. Pat. No. 6,689,859 to Li et. al. discloses a hydrosilylation reaction curable composition comprising a) a silsesquioxane polymer, (b) a mixture of silane and/or siloxane cross-linking compounds and c) a hydrosilylation reaction catalyst. The '859 patent teaches that the curable composition is cured to form a cured resin having high fracture toughness and strength without the loss of elastic modulus.

U.S. Pat. No. 6,646,039 to Li et. al. discloses a hydrosilylation reaction curable composition comprising a) a silsesquioxane polymer, b) a cross-linking compound, c) a hydrosilylation reaction catalyst, and d) colloidal silica having a surface coating formed thereon. The '039 patent teaches that the curable composition is cured to form a cured resin having high fracture toughness and strength without the loss of elastic modulus and glass transition temperature.

Although the preceding references disclose silicone compositions that cure to form silicone products having high fracture toughness, the compositions are unsatisfactory for certain applications, for example, resin transfer molding, which require lower viscosity and higher flow. Although organic solvents can be used to reduce the viscosity of the silicone compositions, solvents also increase the VOC (volatile organic compound) content of the compositions. Moreover, compositions containing organic solvents cannot be satisfactorily cured in closed systems, such as molds.

Consequently, there is a need for a hydrosilylation addition-curable silicone composition having lower viscosity that cures to form a silicone product having superior fracture toughness.

SUMMARY OF THE INVENTION

The present invention is directed to a silicone composition comprising:

(A) an organopolysiloxane resin having an average of at least two silicon-bonded alkenyl groups per molecule, wherein the resin has the formula:

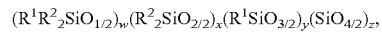

wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^2$ are alkenyl;

(B) an organohydrogensilane in an amount sufficient to cure the composition, the organohydrogensilane having the formula:

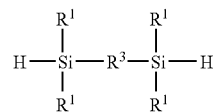

wherein $R^1$ is $C_1$ to $C_{10}$ hydrocarbyl or $C_1$ to $C_{10}$ halogen-substituted hydrocarbyl, both free of aliphatic unsaturation, and $R^3$ is a hydrocarbylene group having a formula selected from:

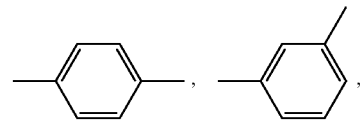

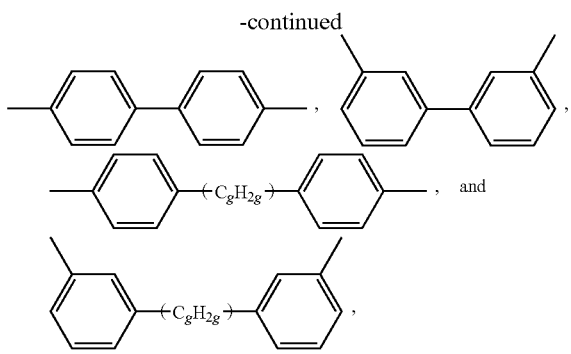

wherein g is from 1 to 6;

(C) an effective amount of a reactive diluent comprising (i) an organosiloxane having an average of at least two silicon-bonded alkenyl groups per molecule and a viscosity of from 0.001 to 2 Pa·s at 25° C., wherein the viscosity of (C)(i) is not greater than 20% of the viscosity of component (A) and the organosiloxane has the formula $(R^1R^2{}_2SiO_{1/2})_m(R^2{}_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n 0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (C)(ii) per mole of alkenyl groups in (C)(i), wherein the organohydrogensiloxane has the formula $(HR^1{}_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0; and (D) a catalytic amount of a hydrosilylation catalyst.

The present invention is further directed to a cured silicone resin prepared by curing the aforementioned silicone composition.

The silicone composition of the present invention has numerous advantages, including low VOC content and adjustable cure. Also, the viscosity of the silicone composition can be varied over a wide range, depending on the requirements of a particular application. Importantly, the silicone composition typically has a lower viscosity than a similar composition lacking the reactive diluent, component (C), of this invention.

The silicone composition of the present invention, which does not contain an organic solvent, has a very low VOC content. Consequently, the silicone composition avoids the health, safety, and environmental hazards associated with solvent-borne compositions. In addition, the solventless composition of the present invention typically undergoes less shrinkage during curing than solvent-borne silicone compositions.

Additionally, the silicone composition of the present invention cures rapidly at temperatures from room temperature to moderately elevated temperatures without the formation of detectable byproducts to produce a cured silicone resin having high fracture toughness. In fact, the cure rate of the silicone composition can be conveniently adjusted by regulating the concentration of catalyst and/or optional inhibitor.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

DETAILED DESCRIPTION OF THE INVENTION

As used herein, the term "hydrocarbyl free of aliphatic unsaturation" means the hydrocarbyl group does not contain an aliphatic carbon-carbon double bond or carbon-carbon triple bond. Also, the term "mol % of the groups $R^2$ are alkenyl" is defined as the ratio of the number of moles of silicon-bonded alkenyl groups to the total number of moles of the groups $R^2$ in the organopolysiloxane resin, multiplied by 100.

A silicone composition according to the present invention comprises:

(A) an organopolysiloxane resin having an average of at least two silicon-bonded alkenyl groups per molecule, wherein the resin has the formula:

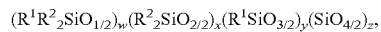

wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^2$ are alkenyl;

(B) an organohydrogensilane in an amount sufficient to cure the composition, the organohydrogensilane having the formula:

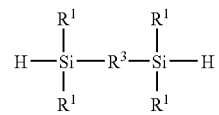

wherein $R^1$ is $C_1$ to $C_{10}$ hydrocarbyl or $C_1$ to $C_{10}$ halogen-substituted hydrocarbyl, both free of aliphatic unsaturation, and $R^3$ is a hydrocarbylene group having a formula selected from:

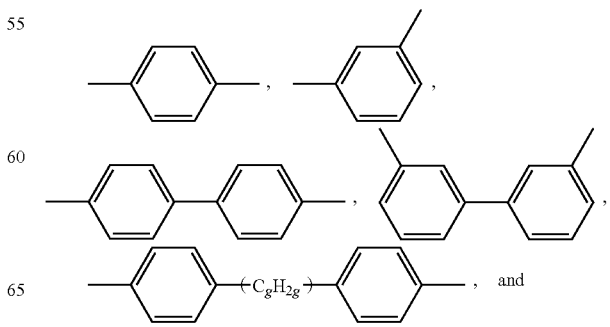

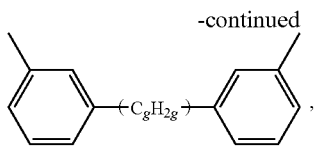

wherein g is from 1 to 6;

(C) an effective amount of a reactive diluent comprising (i) an organosiloxane having an average of at least two silicon-bonded alkenyl groups per molecule and a viscosity of from 0.001 to 2 Pa·s at 25° C., wherein the viscosity of (C)(i) is not greater than 20% of the viscosity of component (A) and the organosiloxane has the formula $(R^1R^2{}_2SiO_{1/2})_m(R^2{}_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (C)(ii) per mole of alkenyl groups in (C)(i), wherein the organohydrogensiloxane has the formula $(HR^1{}_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0; and (D) a catalytic amount of a hydrosilylation catalyst.

Component (A) is at least one organopolysiloxane resin having an average of at least two silicon-bonded alkenyl groups per molecule, wherein the resin has the formula:

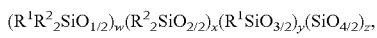

wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z−1, y+z/(w+x+y+z) is from 0.2 to 0.99, w+x/(w+x+y+z) is from 0.01 to 0.8, and at least 50 mol % of the groups $R^2$ are alkenyl.

The hydrocarbyl and halogen-substituted hydrocarbyl groups represented by $R^1$ are free of aliphatic unsaturation and typically have from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different, typically have from 2 to about 10 carbon atoms, alternatively from 2 to 6 carbon atoms, and are exemplified by, but not limited to, vinyl, allyl, butenyl, hexenyl, and octenyl.

In the formula of the organopolysiloxane resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0.01 to 0.80, alternatively from 0.05 to 0.5, alternatively from 0.1 to 0.35.

Typically at least 50 mol %, alternatively at least 65 mol %, alternatively at least 80 mol % of the groups $R^2$ in the organopolysiloxane resin are alkenyl.

The organopolysiloxane resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and organopolysiloxane resin (MQ) standards.

The viscosity of the organopolysiloxane resin at 25° C. is typically from 0.01 to 100,000 Pa·s, alternatively from 0.1 to 10,000 Pa·s, alternatively from 1 to 100 Pa·s.

The organopolysiloxane resin typically contains less than 10% (w/w), alternatively less than 5% (w/w), alternatively less than 2% (w/w), of silicon-bonded hydroxy groups, as determined by $^{29}$Si NMR.

The organopolysiloxane resin contains $R^1SiO_{3/2}$ units (i.e., T units) and/or $SiO_{4/2}$ units (i.e., Q units) in combination with $R^1R^2{}_2SiO_{1/2}$ units (i.e., M units) and/or $R^2{}_2SiO_{2/2}$ units (i.e., D units), wherein $R^1$ and $R^2$ are as defined and exemplified above. For example, the organopolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organopolysiloxane resins include, but are not limited to, resins having the following formulae: $(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}$ $(SiO_{4/2})_{0.1}$, and $(Vi_2MeSiO_{1/2})_{0.15}(ViMe_2SiO_{1/2})_{0.1}(PhSiO_{3/2})_{0.75}$, where Me is methyl, Vi is vinyl, Ph is phenyl, and the numerical subscripts denote mole fractions.

Component (A) can be a single organopolysiloxane resin or a mixture comprising two or more organopolysiloxane resins that differ in at least one of the following properties: structure, viscosity, average molecular weight, siloxane units, and sequence.

Methods of preparing organopolysiloxane resins are well known in the art; many of these resins are commercially available. Organopolysiloxane resins are typically prepared by cohydrolyzing the appropriate mixture of chlorosilane precursors in an organic solvent, such as toluene. For example, an organopolysiloxane resin consisting essentially of $R^1R^2{}_2SiO_{1/2}$ units and $R^1SiO_{3/2}$ units can be prepared by cohydrolyzing a compound having the formula $R^1R^2{}_2SiCl$ and a compound having the formula $R^1SiCl_3$ in toluene, where $R^1$ and $R^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Component (B) is at least one organohydrogensilane having the formula:

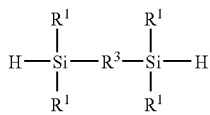

wherein R$^1$ is C$_1$ to C$_{10}$ hydrocarbyl or C$_1$ to C$_{10}$ halogen-substituted hydrocarbyl, both free of aliphatic unsaturation, and R$^3$ is a hydrocarbylene group having a formula selected from:

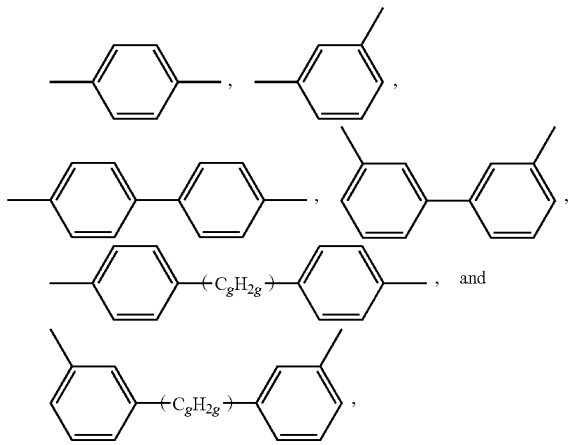

wherein g is from 1 to 6. The hydrocarbyl and halogen-substituted hydrocarbyl groups represented by R$^1$ are as defined and exemplified above for the organopolysiloxane resin, component (A), of the silicone composition.

Examples of organohydrogensilanes include, but are not limited to, compounds having the following formulae:

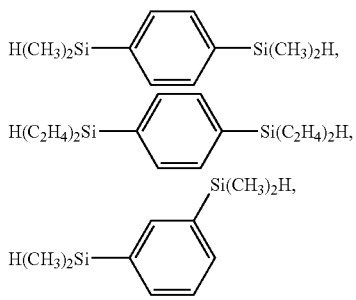

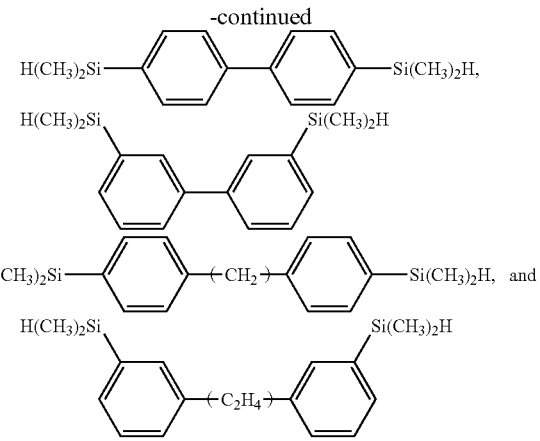

Component (B) can be a single organohydrogensilane or a mixture comprising two or more different organohydrogensilanes, each as described above.

Methods of preparing organohydrogensilanes, such as the reaction of Grignard reagents with aryl halides, are well known in the art. For example, organohydrogensilanes having the formula HR$^1$$_2$Si—R$^3$—SiR$^1$$_2$H can be prepared by treating an aryl dihalide having the formula R$^3$X$_2$ with magnesium in ether to produce the corresponding Grignard reagent and then treating the Grignard reagent with a chlorosilane having the formula HR$^1$$_2$SiCl, where R$^1$ and R$^3$ are as defined and exemplified above.

The concentration of component (B) is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is sufficient to provide from 0.5 to 2 moles of silicon-bonded hydrogen atoms, alternatively from 0.8 to 1.8 moles of silicon-bonded hydrogen atoms, alternatively from 1.0 to 1.2 moles of silicon-bonded hydrogen atoms, per mole of alkenyl groups in component (A).

Component (C) is a reactive diluent comprising (i) an organosiloxane having an average of at least two silicon-bonded alkenyl groups per molecule and a viscosity of from 0.001 to 2 Pa·s at 25° C., wherein the viscosity of (C)(i) is not greater than 20% of the viscosity of component (A) and the organosiloxane has the formula (R$^1$R$^2$$_2$SiO$_{1/2}$)$_m$ (R$^2$$_2$SiO$_{2/2}$)$_n$ (R$^1$SiO$_{3/2}$)$_p$(SiO$_{4/2}$)$_q$, wherein R$^1$ is C$_1$ to C$_{10}$ hydrocarbyl or C$_1$ to C$_{10}$ halogen-substituted hydrocarbyl, both free of aliphatic unsaturation, R$^2$ is R$^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (C)(ii) per mole of alkenyl groups in (C)(i), wherein the organohydrogensiloxane has the formula (HR$^1$$_2$SiO$_{1/2}$)$_s$(R$^1$SiO$_{3/2}$)$_t$(SiO$_{4/2}$)$_v$, wherein R$^1$ is C$_1$ to C$_{10}$ hydrocarbyl or C$_1$ to C$_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

Component (C)(i) is at least one organosiloxane having an average of at least two silicon-bonded alkenyl groups per molecule and a viscosity of from 0.001 to 2 Pa·s at 25° C., wherein the viscosity of (C)(i) is not greater than 20% of the viscosity of component (A) and the organosiloxane has the formula $(R^1R^2{}_2SiO_{1/2})_m(R^2{}_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal (i.e., not all the alkenyl groups in the organosiloxane are in $R^1R^2{}_2SiO_{1/2}$ units). Further, organosiloxane (C)(i) can have a linear, branched, or cyclic structure. For example, when the subscripts m, p, and q in the formula of organosiloxane (C)(i) are each equal to 0, the organosiloxane is an organocyclosiloxane.

The viscosity of organosiloxane (C)(i) at 25° C. is typically not greater than 20%, alternatively not greater than 10%, alternatively not greater than 1%, of the viscosity of component (A). For example, the viscosity of organosiloxane (C)(i) at 25° C. is typically from 0.001 to 2 Pa·s, alternatively from 0.001 to 0.1 Pa·s, alternatively from 0.001 to 0.05 Pa·s.

Examples of organosiloxanes suitable for use as organosiloxane (C)(i) include, but are not limited to, organosiloxanes having the following formulae: $(ViMeSiO)_3$, $(ViMeSiO)_4$, $(ViMeSiO)_5$, $(ViMeSiO)_6$, $(ViPhSiO)_3$, $(ViPhSiO)_4$, $(ViPhSiO)_5$, $(ViPhSiO)_6$, $ViMe_2SiO(ViMeSiO)_nSiMe_2Vi$, $Me_3SiO(ViMeSiO)_nSiMe_3$, and $(ViMe_2SiO)_4Si$, where Me is methyl, Ph is phenyl, Vi is vinyl, and the subscript n has a value such that the organosiloxane has a viscosity of from 0.001 to 2 Pa·s at 25° C.

Component (C)(i) can be a single organosiloxane or a mixture of two or more different organosiloxanes, each as described above. Methods of making alkenyl-functional organosiloxanes are well known in the art.

Component (C)(ii) is at least one organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (C)(ii) per mole of alkenyl groups in (C)(i), wherein the organohydrogensiloxane has the formula $(HR^1{}_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

The viscosity of organohydrogensiloxane (C)(ii) at 25° C. is typically from 0.001 to 2 Pa·s, alternatively from 0.001 to 0.1 Pa·s, alternatively from 0.001 to 0.05 Pa·s.

Examples of organohydrogensiloxanes suitable for use as organohydrogensiloxane (C)(ii) include, but are not limited to, organohydrogensiloxanes having the following formulae: $PhSi(OSiMe_2H)_3$, $Si(OSiMe_2H)_4$, $MeSi(OSiMe_2H)_3$, $(HMe_2SiO)_3SiOSi(OSiMe_2H)_3$, and $(HMe_2SiO)_3SiOSi(Ph)(OSiMe_2H)_2$, where Me is methyl and Ph is phenyl.

Component (C)(ii) can be a single organohydrogensiloxane or a mixture of two or more different organohydrogensiloxanes, each as described above. Methods of making organohydrogensiloxanes are well known in the art.

The concentration of component (C)(ii) is sufficient to provide from 0.5 to 3 moles of silicon-bonded hydrogen atoms, alternatively from 0.6 to 2 moles of silicon-bonded hydrogen atoms, alternatively from 0.9 to 1.5 moles of silicon-bonded hydrogen atoms, per mole of alkenyl groups in component (C)(i).

Component (C), which comprises (C)(i) and (C)(ii), is present in an effective amount in the silicone composition. As used herein, the term "effective amount" means that the concentration of component (C) is such that the silicone composition has a lower viscosity than the same composition absent only the reactive diluent. Typically, the concentration of component (C) is such that the silicone composition has a viscosity not greater than 75%, alternatively not greater than 40% of the viscosity of the same composition absent the reactive diluent. The concentration of component (C) is typically from 1 to 90% (w/w), alternatively from 1 to 50% (w/w), alternatively from 1 to 20% (w/w), alternatively from 1 to 10% (w/w), based on the combined weight of components (A) and (B).

Component (D) is at least one hydrosilylation catalyst that promotes the hydrosilylation addition reactions of components (A), (B), and (C). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein; and U.S. Pat. No. 5,017,654.

Component (D) can be a single hydrosilylation catalyst or a mixture comprising two or more different catalysts that differ in at least one property, such as structure, form, platinum group metal, complexing ligand, and thermoplastic resin.

The concentration of component (D) is sufficient to catalyze the hydrosilylation addition reactions of components (A), (B), and (C). Typically, the concentration of component (D) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

The silicone composition can comprise additional ingredients, provided the ingredient does not prevent the composition from curing to form a silicone resin having high fracture toughness, as described above. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; and flow control additives.

The silicone composition can be a one-part composition comprising components (A) through (D) in a single part or, alternatively, a multi-part composition comprising components (A) through (D) in two or more parts. For example, a multi-part silicone composition can comprise a first part containing a portion of component (A), a portion of component (C)(i), and all of component (D), and a second part containing the remaining portions of components (A) and (C)(i), and all of components (B) and (C)(ii).

The one-part silicone composition is typically prepared by combining components (A) through (D) and any optional ingredients in the stated proportions at ambient temperature. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

A cured silicone resin according to the present invention can be prepared by curing the aforementioned silicone composition. The silicone composition can be cured at a temperature from about room temperature to about 250° C., preferably from about room temperature to about 200° C., and more preferably from about room temperature to about 150° C., for a suitable length of time. For example, the silicone composition typically cures in less than about one hour at 150° C.

The silicone composition of the present invention has numerous advantages, including low VOC content and adjustable cure. Also, the viscosity of the silicone composition can be varied over a wide range, depending on the requirements of a particular application. Importantly, the silicone composition typically has a lower viscosity than a similar composition lacking the reactive diluent, component (C), of this invention.

The silicone composition of the present invention, which does not contain an organic solvent, has a very low VOC content. Consequently, the silicone composition avoids the health, safety, and environmental hazards associated with solvent-borne compositions. In addition, the solventless composition of the present invention typically undergoes less shrinkage during curing than solvent-borne silicone compositions.

Additionally, the silicone composition of the present invention cures rapidly at temperatures from room temperature to moderately elevated temperatures without the formation of detectable byproducts to produce a cured silicone resin having high fracture toughness. In fact, the cure rate of the silicone composition can be conveniently adjusted by regulating the concentration of catalyst and/or optional inhibitor.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

EXAMPLES

The following examples are presented to better illustrate the silicone composition of the present invention, but are not to be considered as limiting the invention, which is delineated in the appended claims. Unless otherwise noted, all parts and percentages reported in the examples are by weight. The following methods and materials were employed in the examples:

Preparation of Test Specimens for Measurement of Mechanical Properties

The silicone composition was applied to a polyethyleneterephthalate (PET) sheet (0.13 mm) to produce a uniform coating having a thickness of 0.51 mm. A second PET sheet (0.13 mm) was laid on top of the coating to create a sandwich structure. The assembly was passed through two stainless steel bars spaced apart 0.43 mm and cured in an oven at 150° C. for 4 min. After cure the PET sheets were peeled away from the cured silicone resin film. The film was cut into dumbbell-shaped test specimens having a length of 25 mm and a center width of 5 mm. The wider ends of the specimens were reinforced with adhesive tape. The test specimens were kept at 23±2° C. for at least 24 h before testing.

Measurement of Mechanical Properties

Young's modulus, tensile strength, and tensile strain at break were measured using an MTS Alliance RT/5 testing frame, equipped with a 100-N load cell. The test specimen was loaded into two pneumatic grips spaced apart 25 mm and pulled at a crosshead speed of 1 mm/min. Load and displacement data were continuously collected. The steepest slope in the initial section of the load-displacement curve was taken as the Young's modulus.

The highest point on the load-displacement curve was used to calculate the tensile strength according to the equation:

$$\sigma = F/(wb),$$

where:

$\sigma$=tensile strength, MPa,

F=highest force, N, w=width of the test specimen, mm, and b=thickness of the test specimen, mm.

The tensile strain at break was approximated by dividing the difference in grip separation before and after testing by the initial separation according to the equation:

$$\epsilon = 100(l_2 - l_1)/l_1,$$

where:

$\epsilon$=tensile strain at break, %, $l_2$=final separation of the grips, mm, and $l_1$=initial separation of the grips, mm.

Reported values for Young's modulus (GPa), tensile strength (MPa), and tensile strain (%) each represent the average of three measurements made on different dumbbell-shaped test specimens from the same cured silicone resin film.

Platinum Catalyst is a hydrosilylation catalyst prepared by treating a solution of 0.054 g of triphenylphosphine in 4.95 g of toluene with 5 g of a solution of a platinum(0) complex of 1,1,3,3-tetramethyldisiloxane in toluene (0.2% platinum). The mixture was kept at room temperature for 2 h before use.

Reactive Diluent is a mixture consisting of 100 g of tetravinyltetramethylcyclo-tetrasiloxane and 128 g of phenyltris(dimethylsiloxy)silane.

Example 1

This example demonstrates the preparation of the organopolysiloxane resin used in Example 3 and Comparative Example 1. Trimethoxyphenylsilane (200 g), tetramethyldivinyldisiloxane (38.7 g), deionized water (65.5 g), toluene (256 g), and trifluoromethanesulfonic acid (1.7 g) were combined in a 3-neck, round-bottom flask equipped with a Dean-Stark Trap and thermometer. The mixture was heated at 60 to 65° C. for 2 hours. The mixture was then heated to reflux and water and methanol were removed using a Dean-Stark trap. When the temperature of the mixture reached 80° C. and the removal of water and methanol was complete, the mixture was cooled to less than 50° C. Calcium carbonate (3.3 g) and water (about 1 g) were added to the mixture. The mixture was stirred at room temperature for 2 hours and then potassium hydroxide (0.17 g) was added to the mixture. The mixture was then heated to reflux and water was removed using a Dean-Stark trap. When the reaction temperature reached 120° C. and the removal of water was complete, the mixture was cooled to less than 40° C. Chlorodimethylvinylsilane (0.37 g) was added to the mixture and mixing was continued at room temperature for 1 hour. The mixture was filtered to give a solution of an organopolysiloxane resin having the formula $(PhSiO_{3/2})_{0.75}(ViMe_2SiO_{1/2})_{0.25}$ in toluene. The resin has a weight-average molecular weight of about 1700, has a number-average molecular weight of about 1440, and contains about 1 mol % of silicon-bonded hydroxy groups.

The volume of the solution was adjusted to produce a solution containing 79.5 percent by weight of the organopolysiloxane resin in toluene. The resin concentration of a solution was determined by measuring the weight loss after drying a sample (2.0 g) of the solution in an oven at 150° C. for 1.5 hours.

Example 2

This example describes the preparation of 1,4-bis(dimethylsilyl)benzene. Magnesium (84 g) and tetrahydrofuran (406 g) were combined under nitrogen in a 5-L, three-neck flask equipped with a mechanical stirrer, condenser, two addition funnels, and thermometer. 1,2-dibromoethane (10 g) was added to the mixture and the contents of the flask were heated to 50 to 60° C. Tetrahydrofuran (THF, 200 mL) and a solution of 1,2-dibromobenzene (270 g) in THF (526 g) were sequentially added to the mixture, the latter in a drop-wise manner. After about twenty minutes, heating was discontinued and the remainder of the 1,2-dibromobenzene was added over a period of about 1.5 hours at such a rate as to maintain a gentle reflux. During the addition, THF was periodically added to maintain a reaction temperature less than about 65° C. After the addition of the 1,2-dibromobenzene was complete, THF (500 mL) was added to the flask and the mixture was heated at 65° C. for 5 hours. Heating was discontinued and the reaction mixture was stirred at room temperature overnight under nitrogen.

THF (500 mL) was added to the mixture and the flask was placed in an ice water bath. A dry-ice condenser was inserted into the top of the water condenser and chlorodimethylsilane (440 g) was added drop-wise to the mixture at such a rate as to maintain reflux. After the addition was complete, the flask was removed from the ice water bath and the mixture was heated at 60° C. overnight. The mixture was cooled to room temperature and treated sequentially with toluene (1000 mL) and saturated aqueous $NH_4Cl$ (1500 mL). The contents of the flask were transferred to a separatory funnel and washed with several portions of water until a substantially transparent organic layer was obtained. The organic layer was removed, dried over magnesium sulfate, and concentrated by distillation until the temperature of the residue reached 150° C. The concentrated crude product was purified by vacuum distillation. A fraction was collected at 125-159° C. under a pressure of 12 mmHg (1600 Pa) to give p-bis(dimethylsilyl)benzene (140 g) as a colorless liquid. The identity of the product was confirmed by GC-MS, FT-IR, $^1$H NMR, and $^{13}$C NMR.

Example 3

The resin solution of Example 1 was mixed with 1,4-bis(dimethylsilyl)benzene, the relative amounts of the two ingredients sufficient to achieve a mole ratio of silicon-bonded hydrogen atoms to silicon-bonded vinyl groups (SiH/SiVi) of 1.1:1, as determined by $^{29}$Si NMR and $^{13}$C NMR. The mixture was heated at 80° C. under a pressure of 5 mmHg (667 Pa) to remove the toluene. Then, a small amount of 1,4-bis(dimethylsilyl)benzene was added to the mixture to restore the mole ratio SiH/SiVi to 1.1:1. The mixture (95 g) was treated with 5 g of Reactive Diluent, followed by 0.5 g of Platinum Catalyst. The mechanical properties of the cured silicone resin are shown in Table 1.

Comparative Example 1

The resin solution of Example 1 was mixed with 1,4-bis(dimethylsilyl)benzene, the relative amounts of the two ingredients sufficient to achieve a mole ratio of silicon-bonded hydrogen atoms to silicon-bonded vinyl groups (SiH/SiVi) of 1.1:1, as determined by $^{29}$Si NMR and $^{13}$C NMR. The mixture was heated at 80° C. under a pressure of 5 mmHg (667 Pa) to remove the toluene. Then, a small amount of 1,4-bis(dimethylsilyl)benzene was added to the mixture to restore the mole ratio SiH/SiVi to 1.1:1. The mixture (100 g) was treated with 0.5 g of Platinum Catalyst. The mechanical properties of the cured silicone resin are shown in Table 1.

TABLE 1

| Example | Young's Modulus (Gpa) | Tensile Strength (MPa) | Tensile Strain (%) |
|---|---|---|---|
| 3 | 1.60 ± 0.12 | 61.1 ± 0.2 | 4 |
| Comp. 1 | 1.57 | 24 | 18 |

What is claimed is:
1. A silicone composition comprising:
(A) an organopolysiloxane resin having an average of at least two silicon-bonded alkenyl groups per molecule, wherein the resin has the formula:

wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^2$ are alkenyl;

(B) an organohydrogensilane in an amount sufficient to cure the composition, the organohydrogensilane having the formula:

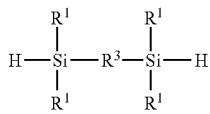

wherein $R^1$ is a $C_1$ to $C_{10}$ hydrocarbyl or $C_1$ to $C_{10}$ halogen-substituted hydrocarbyl, both free of aliphatic unsaturation, and $R^3$ is a hydrocarbylene group having a formula selected from:

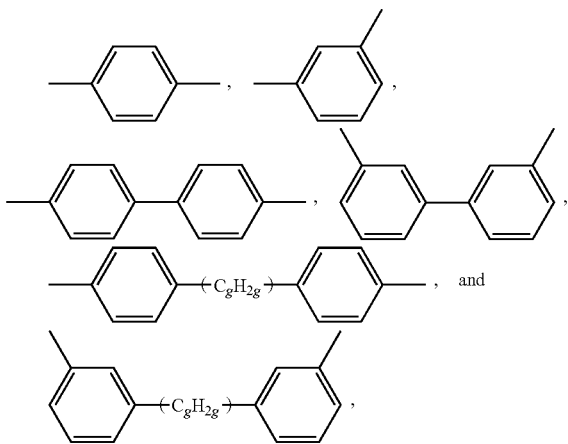

wherein g is from 1 to 6;

(C) an effective amount of a reactive diluent comprising (i) an organosioxane having an avenge of at least two silicon-bonded alkenyl groups per molecule and a viscosity of from 0.001 to 2 Pa·s at 25° C., wherein the viscosity of (C)(i) is not greater than 20% of the viscosity of component (A) and the organosiloxane has the formula $(R^1R^2{}_2SiO_{1/2})_m(R^2{}_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (C)(ii) per mole of alkenyl groups in (C)(i), wherein the organohydrogensioxane has the formula $(HR^1{}_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0; and (D) a catalytic amount of a hydrosilylation catalyst.

2. The silicone composition according to claim 1, wherein w is from 0.02 to 0.75, x is from 0 to 0.45, y is from 0.25 to 0.8, z is from 0 to 0.25, y+z/(w+x+y+z) is from 0.5 to 0.95, and w+x/(w+x+y+z) is from 0.05 to 0.5.

3. The silicone composition according to claim 1, wherein at least 65 mol % of the groups $R^2$ in the organopolysiloxane resin of component (A) are alkenyl.

4. The silicone composition according to claim 1, wherein the organopolysiloxane resin of component (A) has a number-average molecular weight of from 500 to 10,000.

5. The silicone composition according to claim 1, wherein the organopolysiloxane resin of component (A) has a viscosity of from 0.1 to 10,000 Pa·s at 25° C.

6. The silicone composition according to claim 1, wherein the concentration of component (B) is sufficient to provide from 0.8 to 1.8 moles of silicon-bonded hydrogen atoms per mole of alkenyl groups in component (A).

7. The silicone composition according to claim 1, wherein the viscosity of the organosiloxane (C)(i) at 25° C. is from 0.001 to 0.1 Pa·s.

8. The silicone composition according to claim 1, wherein the viscosity of organohydrogensiloxane (C)(ii) at 25° C. is from 0.001 to 0.1 Pa·s.

9. The silicone composition according to claim 1, wherein the concentration of component (C)(ii) is sufficient to provide from 0.6 to 2 moles of silicon-bonded hydrogen atoms per mole of alkenyl groups in component (C)(i).

10. The silicone composition according to claim 1, wherein the concentration of component (C) is from 1 to 50% (w/w), based on the combined weight of components (A) and (B).

11. A cured silicone resin prepared by curing the silicone composition according to claim 1.

* * * * *